June 10, 1930.  A. LADE  1,762,444
JOURNAL BEARING
Filed Aug. 17, 1927  2 Sheets-Sheet 2
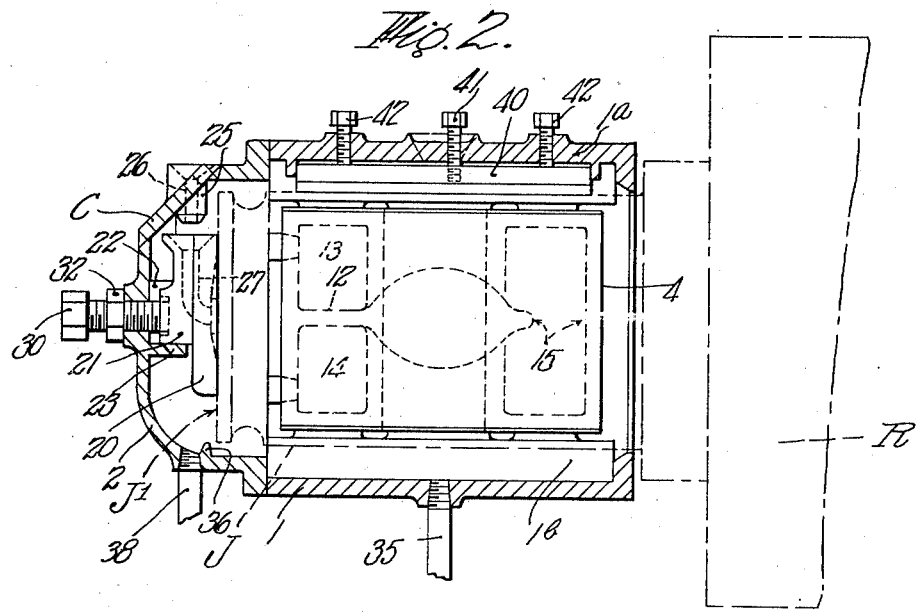
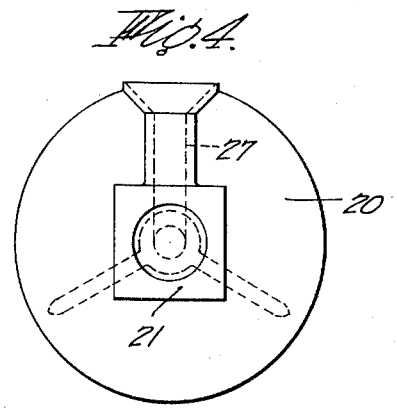
INVENTOR.
Archibald Lade
BY Chapin & Neal
ATTORNEYS.

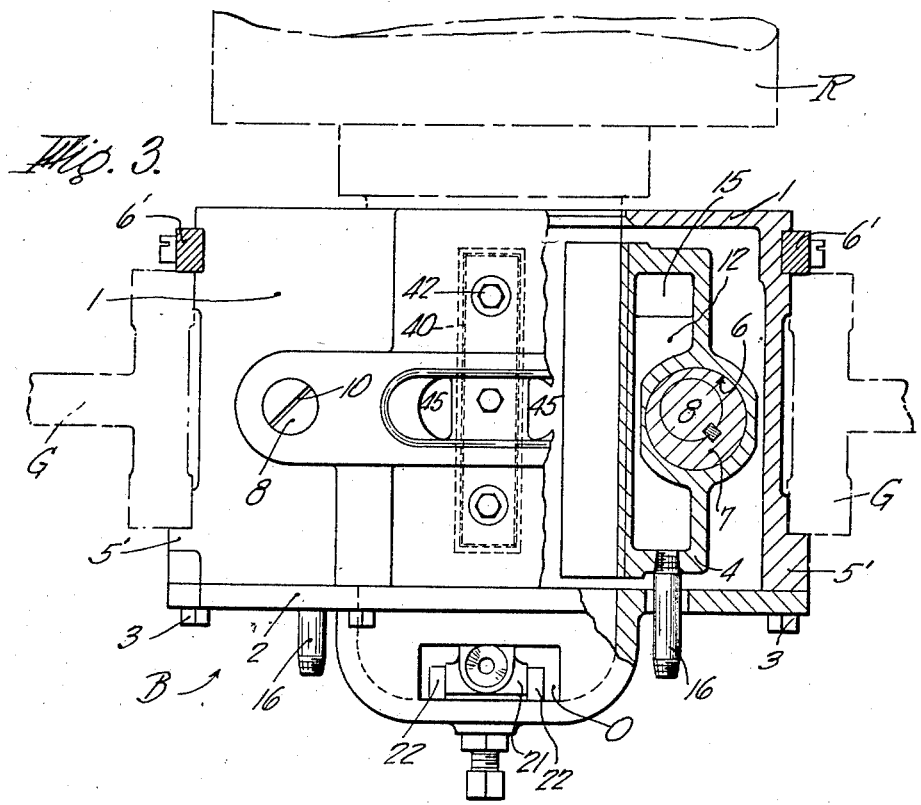

Patented June 10, 1930

1,762,444

UNITED STATES PATENT OFFICE

ARCHIBALD LADE, OF NORTHAMPTON, MASSACHUSETTS, ASSIGNOR TO B. F. PERKINS & SON, INC., OF HOLYOKE, MASSACHUSETTS, A CORPORATION OF MASSACHUSETTS

JOURNAL BEARING

Application filed August 17, 1927. Serial No. 213,679.

This invention relates to improvements in journal bearings and more particularly to improvements in bearings for the journals of rolls of calenders and the like.

As is well known, calenders consist essentially of a stack or plurality of rolls in peripheral contact with one another which have their journals mounted in bearings arranged for an up and down movement in side frames or supports so that the rolls may bear upon one another.

The calender rolls are not only required to be heavy but must be held on a definite axis of rotation in order to function with the proper calendering action. For certain purposes, it may be desirable that the axis of one roll be held in accurate alignment with that of an adjacent roll, while for other purposes it is desirable to hold the axis of one roll slightly to one side or the other of that of an adjacent roll. The weight of the rolls naturally causes considerable friction in the journal bearings which results in wear so that the journal tends to wabble in its bearing, whereby its axis of rotation is not held as is desired.

Accordingly, one of the principal features of my invention is the provision of a divided bearing which has bearing steps that may be positively moved relative to one another and fixed in adjusted position so as to take up wear and at the same time maintain the roll journal on a definite, true axis of rotation so that the roll will contact as may be desired with the roll or rolls adjacent thereto. This is accomplished by providing a bearing block which has the bearing steps accurately guided therein for movements independent of one another and means for positively and independently propelling the steps towards or away from one another or the axis of rotation of the roll journal.

As a further important feature of the invention, in order to reduce friction between the journal and bearings steps and to thereby reduce the wear thereof, I provide means for facilitating the cooling of the bearing which is adapted and arranged to permit the desired relative movement of the steps and bearings for the adjustment thereof. This is accomplished by providing hollowed out bearing steps to thereby provide chambers for receiving a cooling medium and flexible connections between the chambers of the steps of one bearing and those of another so that a cooling medium may flow through the various bearings.

Also it is necessary and desirable for certain purposes that the roll be adjustable or shiftable longitudinally in one direction or the other and that they be held for rotation in their adjusted position.

Accordingly, a further feature of the invention is the provision of means for positively moving the roll longitudinally of its axis and for maintaining it in adjusted positions.

According to a still further feature of the invention, means are provided for lubricating the bearing which is adapted and arranged so that lubricant, after passing through one bearing, is delivered to an adjacent bearing so as to provide a continuous flow of lubricant through the several bearings of a calender.

Other novel features and advantages of the invention will be observed from the following description of the invention which for the purposes of disclosure is illustrated in the form at present preferred by means of the accompanying drawings in which:

Fig. 1 is a front elevational view partly in section of a journal bearing which embodies the features of my invention;

Fig. 2 is a sectional elevational view taken on the line 2—2 of Fig. 1;

Fig. 3 is a plan view partly in section of the bearing and showing particularly the means for moving the bearing steps; and Fig. 4 is an elevational view of one of the thrust members for bearing against an end of the roll journal.

Referring to the drawings in detail, a calender roll bearing block B is shown which is adapted to be guided for up and down movements between guides G of a calender frame. The guides are usually formed by spaced tracks G, shown in dotted lines and which form no part of the present invention.

Each of the bearing blocks B is preferably hollowed out in box-like form and receives a pair of movable bearing steps 4 for engaging opposite sides of a journal or shaft and is provided with a front cover plate 2 which may be removably secured thereto by any suitable means such as by screws 3 or the like. An opening O, which may be termed a peek hole, is provided in the upper side of the cover plate 2 and a cover plate for closing the peek hole is provided which may be removable therefrom for the purpose later to be described.

The block B is provided on opposite sides (as in Fig. 3) with a guideway which is formed by spaced projections 5' and bars 6'. These guideways receive the spaced guides G of the calender side frames, previously referred to, so that the bearings may move up and down relative to one another accordingly as the calender rolls are moved in and out of contact with one another by the material being calendered, or when it is desired to move a roll and its bearings along the guides by some mechanical means.

The bearing steps 4 are suitably guided for independent relative movements between upper and lower walls 1$^a$ and 1$^b$ of the block 1 so as to be movable towards and away from one another or towards and away from the axis of a roll journal, and have bearing surfaces 5 on the inner faces of the steps 4 which are arranged to engage opposite sides of a roll journal J (shown in dot-dash lines) and when held against movement in the block 1 serve to rotatably support and position the roll journal in the desired location so that the roll R will be held in a desired position with respect to a roll adjacent thereto.

Openings 6 at the rear side of each of the steps 4 are adapted to receive and embrace a cam member 7 which may be in the form of an eccentric fixed to a shaft 8 rotatable in the upper and lower walls 1$^a$ and 1$^b$ of the block 1 so that as the shafts 8 are turned in one direction or the other, the steps may be independently moved or propelled thereby towards or away from one another or towards and away from the axis of rotation of the calender journal. Since the steps are independently movable, they may not only be moved to take up wear between the bearing surfaces of the journal and steps but may be utilized to move the journal and roll in one direction or the other to locate and maintain the journal as may be desirable and necessary in order to relatively position the rolls to provide the most efficient calendering action of the rolls. Slots 10 in the upper end of the shafts 8 are provided for receiving any suitable tool for rotating the shafts, while locking screws 11 screw threaded in the lower end of the shafts 8 and passing through the lower wall of the block 1 are provided for binding or locking the shafts against rotation or in an adjusted position so as to hold the step in adjusted position.

The bearing surfaces 5 of the steps may be of any desired material and may be provided with lubricating channels or grooves (not shown) for distributing lubricant to the bearing surfaces as is usual practice in bearing construction.

Each of the steps 4 is provided with an enclosed chamber for receiving a cooling medium, the chamber being preferably divided by a horizontal wall or web 12 so as to form upper and lower chambers 13 and 14 which are connected at one end by a passageway 15. Inlet and outlet pipe connections 16 and 17 in communication with the upper and lower chambers 13 and 14 extend outwardly from the forward face of the steps 4 and pass through enlarged openings 18 of the cover plate 2 of the block 1. These openings 18 are preferably somewhat larger than the pipes so as to permit the steps to move relative to one another and to the block 1 for the adjustment referred to.

When a plurality of bearing blocks enclosing the steps are in place between the guides of a calender frame for supporting the journals of a plurality of rolls, the outlet or lower pipe 17 of an upper bearing may be connected by flexible tubing (not shown) or the like to the inlet or upper pipe 16 of the bearing next below so that a cooling medium such as water may be introduced by the pipe 16 of an upper bearing and caused to flow downwardly from one bearing to another for cooling the bearing steps and journal bearings so as to tend to overcome any rise in temperature caused by friction and thereby eliminate wear of the journal and steps to a large degree.

A thrust plate 20 is provided (as shown in Figs. 2 and 4) which is adapted to engage the end face J$^1$ of the roll journal J and has a forward non-cylindrical boss portion 21 for fitting within a socket or pocket formed on the inner side of the cover plate 2 by the ribs 22, 22 and 23, whereby it is held from rotation with the journal.

The peek hole cover C is provided with a depending boss 25 which has a channel or passageway 26 therethrough and a channel 27 of the thrust plate 20 extends upwardly therein which underlies the channel 26 so as to receive lubricant therefrom and deliver it to the abutting faces of the thrust plate and journal.

An adjusting screw 30 screw threaded in the cover plate 2 abuts the thrust plate as shown for forcing the plate against the journal. With a thrust plate bearing against the journals at opposite ends of a roll, it is possible to move a roll back and forth as may be desired and to lock the same in an adjusted position. A locking nut 32 is provided for locking the screw 30 to the cover plate. As lubricant is introduced through the channel 26 of the peek hole cover C of an uppermost bearing of a calender, it will flow downwardly through the channel 27 for lubricating the faces of the plate 20 and roll journal $J^1$. Excess lubricant will drip downwardly from between the faces of the plate and roll journal into the space below the journal and thence through a pipe 35 in the lower wall of the bearing. A rib 36, to form a dam on the lower wall of the bearing, is provided which tends to maintain lubricant at a certain level below the journal, but when the lubricant overflows the rib it will run out through a pipe 38 provided in the lower side of the cover plate 2.

A bearing strip 40 is guided in the upper wall $1^a$ of the bearing block 1 and is adjustable for engaging the upper side of the journal J by means of screws 41 and 42 screw threaded in the bearing as shown. This bearing strip is desirable for many reasons, but is particularly useful when it is desired to support the bearing assembly from the roll journal as when the calender roll is moved upwardly or held or supported by some means to permit access to other rolls therebelow.

Openings 45 in the upper wall of the bearing are provided so that lubricant may be delivered to the upper side of the journal and when the bearings are arranged one above another, lubricant may be delivered from the pipes 35 and 38 of an upper bearing to the channels 26 and openings 45 of a bearing therebelow whereby there will be a continuous flow of lubricant from one bearing to another downwardly through all the bearings of a calender.

The peek hole referred to as having the removable cover C is useful because it is possible, without interfering with the operation of the calender, for the operator to inspect the interior of the bearing and to enable him to make such adjustments as may be desired.

From the above it will be observed that I have provided a journal bearing in which independently movable journal supports may be actuated by means which function to positively effect a movement thereof to the end that wear may be taken up and the journal maintained in any desired position. Also it will be noted that I provide a means of cooling and lubricating the bearing which are arranged so as to permit a relative movement of the bearings or their steps so that they may be adjusted without interfering with the circulation of the cooling or lubricating medium.

I am aware that many changes may be made in the form of the invention without departing from the scope thereof and I prefer therefore to be limited, if at all, by the appended claims rather than by the foregoing description.

What I claim is:

1. A journal bearing for calender rolls and the like comprising in combination, a hollow block having horizontal upper and lower walls, steps guided between said walls for sliding movements in a horizontal plane, the said steps having adjacent inner surfaces to provide a horizontally disposed bearing for a roll shaft and provided with openings therethrough which are disposed on vertical axes, the upper and lower walls being provided with openings disposed on vertical axes and members rotatable in said openings of the walls which are provided with cam portions acting on the openings in said steps whereby as the members are rotated the steps may be moved towards a shaft to align the inner surfaces thereof with a shaft between said steps.

2. A journal bearing for calender rolls and the like comprising in combination, a hollow block having horizontal upper and lower walls, a pair of steps guided by said walls for sliding movements in a horizontal plane, the said steps having their adjacent inner faces formed to provide bearing surfaces for a shaft disposed on a horizontal axis therebetween and provided with openings intermediate their ends and adjacent their outer sides which extend vertically therethrough, members rotatable on vertical axes in said upper and lower walls of said block having eccentric portions in the openings of said steps whereby as they are rotated the said portions may act on said steps intermediate their ends to move them towards one another whereby the bearing surfaces of the steps may align with a shaft and means associated with one end of said rotatable members and a wall of said block to lock said members against rotation.

3. A journal bearing for calender rolls and the like comprising in combination, a hollow block having horizontal upper and lower walls, a pair of steps guided by said walls for sliding movements in a horizontal plane, the said steps having adjacent inner surfaces to form a bearing for a shaft disposed on a horizontal axis and provided with openings at the rear side thereof disposed vertically therein, members rotatable in said upper and lower walls provided with cam portions in the openings of said steps whereby the steps may be moved by a rotation of the members so that the surfaces thereof may align with a shaft, a cover fixed to said walls at one end thereof, a thrust plate guided by said cover for movements towards and away from a shaft journalled between said steps and operable by a screw threaded in said cover, the said plate being provided with an oil channel and the said cover being provided with an oil passageway disposed thereover.

4. A journal bearing for calender rolls and the like comprising in combination, a hollow block having horizontal upper and lower walls, members mounted in said walls for rotation on vertical axes and having eccentrically disposed cam portions intermediate their ends, steps having adjacent inner surfaces to provide a journal for a shaft and with openings for receiving said cam portions, which steps are guided between said walls for relative swinging movements and movements towards and away from one another, whereby the said surfaces of the seats may be aligned with a shaft.

5. A journal bearing for calender rolls and the like comprising in combination, a hollow block having horizontal upper and lower walls, members mounted in said walls for rotation on vertical axes and having eccentrically disposed cam portions intermediate their ends, steps having adjacent inner surfaces to provide a journal for a shaft and with openings for receiving said cam portions which steps are guided between said walls for relative swinging movements and movements towards and away from one another, whereby the said surfaces of the seats may be aligned with a shaft and a bearings trip adjustably mounted in the upper wall of said block having a surface for bearing on a shaft and adjusting screws in said upper wall bearing on said strip whereby it may be moved so that the bearing surface thereof aligns with a shaft.

In testimony whereof I have affixed my signature.

ARCHIBALD LADE.